(12) United States Patent
Uematsu et al.

(10) Patent No.: US 8,757,820 B2
(45) Date of Patent: Jun. 24, 2014

(54) VEHICLE REAR VIEWING DEVICE

(75) Inventors: Hiroshi Uematsu, Wako (JP); Yuya Kishimoto, Wako (JP); Toshihiro Hashimoto, Wako (JP); Yuji Kuwashima, Wako (JP); Miku Sasaki, Wako (JP); Tomoyuki Fujiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 748 days.

(21) Appl. No.: 13/079,025

(22) Filed: Apr. 4, 2011

(65) Prior Publication Data

US 2011/0279896 A1 Nov. 17, 2011

(30) Foreign Application Priority Data

May 13, 2010 (JP) ................................. 2010-111220

(51) Int. Cl.
*G02B 7/182* (2006.01)
*B60R 1/06* (2006.01)
*B60S 1/04* (2006.01)

(52) U.S. Cl.
USPC .................. 359/507; 359/871; 15/250.001

(58) Field of Classification Search
USPC ................... 359/507, 838, 868, 871, 872; 15/250.001
See application file for complete search history.

(56) References Cited

U.S. PATENT DOCUMENTS

| | | | | |
|---|---|---|---|---|
| 1,879,592 A | * | 9/1932 | Thomas | 356/21 |
| 5,337,190 A | * | 8/1994 | Kogita et al. | 359/877 |
| 5,712,736 A | * | 1/1998 | Kogita et al. | 359/841 |
| 5,724,198 A | * | 3/1998 | Nishikawa et al. | 359/841 |
| 5,980,047 A | * | 11/1999 | Kogita et al. | 359/841 |
| 6,860,537 B2 | * | 3/2005 | Seksaria et al. | 296/56 |

FOREIGN PATENT DOCUMENTS

JP 2009-143537 7/2009

* cited by examiner

*Primary Examiner* — Ricky D Shafer
(74) *Attorney, Agent, or Firm* — Ditthavong Mori & Steiner, P.C.

(57) ABSTRACT

A vehicle rear viewing device includes a rear under view mirror provided to face an inner surface of a rear windshield and capable of reflecting an area below and behind a vehicle to an occupant in an interior of the vehicle. A marker indicator is to allow the occupant to view the area below and behind the vehicle through the rear under view mirror to visually recognize a position of a rear end of a vehicle body. A rear wiper is provided on a rear part of the vehicle body so as to face an outer surface of the rear windshield. The marker indicator is provided so as to be covered with at least a part of the rear wiper along a front rear direction of the vehicle in front of the rear wiper when the rear wiper is in an initial position.

20 Claims, 6 Drawing Sheets

VEHICLE REAR VIEWING DEVICE

CROSS-REFERENCE TO RELATED APPLICATIONS

The present application claims priority under 35 U.S.C. §119 to Japanese Patent Application No. 2010-111220 filed May 13, 2010, entitled "Vehicle Rear Viewing Device". The contents of this application are incorporated herein by reference in their entirety.

BACKGROUND OF THE INVENTION

1. Field of the Invention

The present invention relates to a vehicle rear viewing device.

2. Description of the Related Art

As a vehicle rear viewing device, there has been known a device including a rear under view mirror that reflects an area below and behind the body of a vehicle (hereinafter, also referred to as a "vehicle body") to an occupant on a driver seat (see, for example, Japanese Unexamined Patent Application Publication No. 2009-143537).

The rear viewing device disclosed in Japanese Unexamined Patent Application Publication No. 2009-143537 includes the rear under view mirror disposed on the front of a rear windshield (i.e., in the interior of the vehicle) or the back thereof (i.e., on the exterior of the vehicle), and markers, e.g., lines or triangles, for positioning. The markers are arranged on a reflecting mirror of the rear under view mirror and/or rear part of the vehicle body which is reflected on the reflecting mirror. The device is designed so that a driver viewing the rear of the vehicle can accurately grasp the positional relationship between an image reflected on the reflecting mirror and the vehicle by allowing markers on the reflecting mirror to coincide with markers on the rear part of the vehicle body on the surface of the reflecting mirror.

SUMMARY OF THE INVENTION

According to one aspect of the present invention, a vehicle rear viewing device includes a rear under view mirror, a marker indicator, and a rear wiper. The rear under view mirror is provided to face an inner surface of a rear windshield and is capable of reflecting an area below and behind a vehicle to an occupant in an interior of the vehicle. The marker indicator is to allow the occupant to view the area below and behind the vehicle through the rear under view mirror to visually recognize a first position of a rear end of a vehicle body. The rear wiper is provided on a rear part of the vehicle body so as to face an outer surface of the rear windshield. The marker indicator is provided so as to be covered with at least a part of the rear wiper along a front rear direction of the vehicle in front of the rear wiper when the rear wiper is in an initial position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
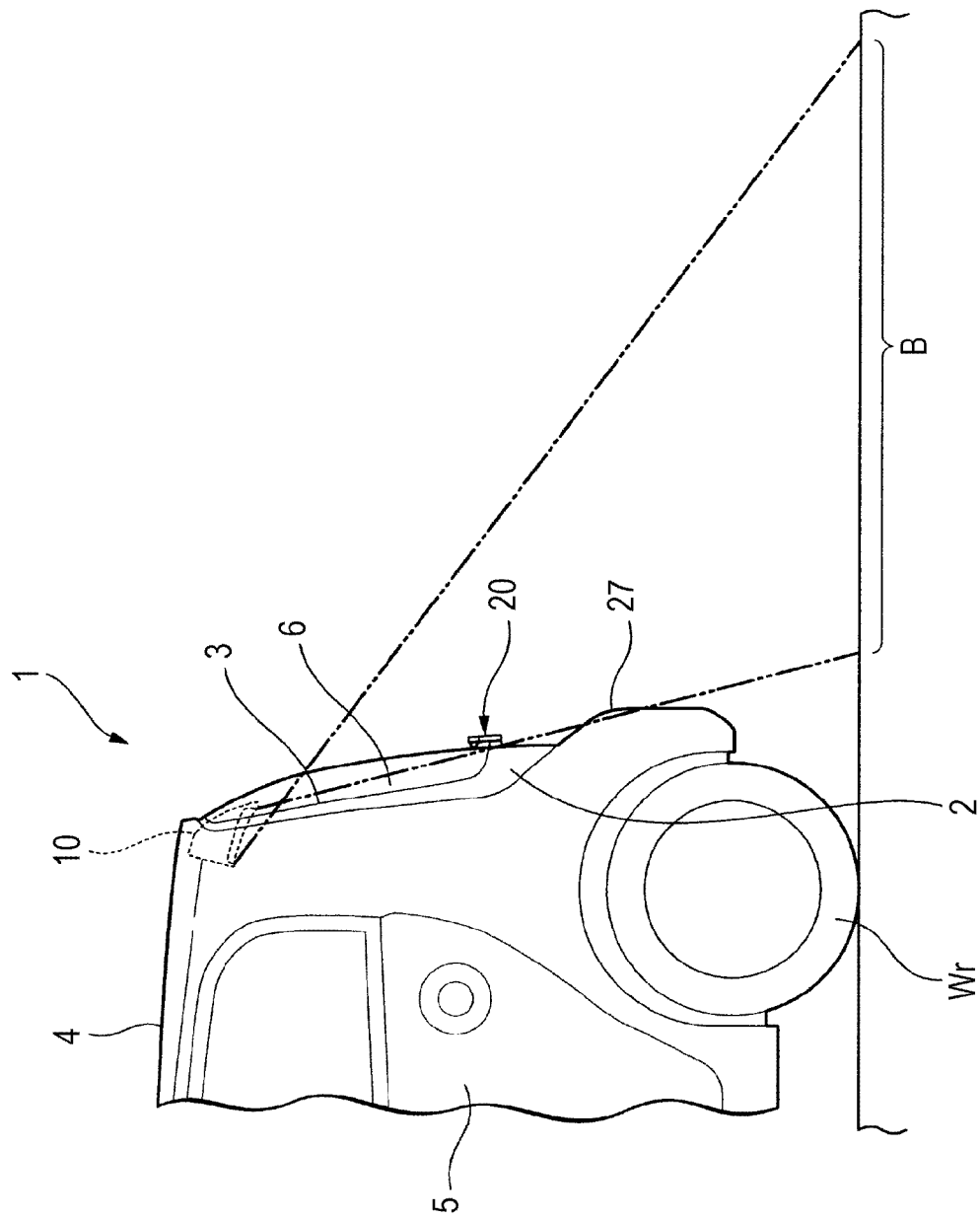
FIG. 1 is a schematic side view of rear part of a vehicle including a rear viewing device according to a first embodiment of the present invention.

Embodiments of the present invention will be described below with reference to the drawings. In the embodiments, the same components are designated by the same reference numerals and redundant explanation is omitted.

A first embodiment will be described with reference to FIGS. 1 to 5.

FIG. 1 illustrates one side of rear part of a vehicle 1, such as a minivan, including a flip-up back door (tailgate) 2. Referring to FIG. 1, the vehicle 1 includes a rear window 3 in upper part of the back door 2, a roof panel 4 of a vehicle body, a rear side door 5, and a rear wheel Wr, a rear windshield 6 fitted to the rear window 3, a rear wiper 20 that wipes the rear surface of the rear windshield 6, and a rear under view mirror 10 that reflects an area, indicated at B in FIG. 1, below and behind the vehicle 1 toward an occupant in the interior of the vehicle (hereinafter, also referred to as the "vehicle interior").

Figure 2:
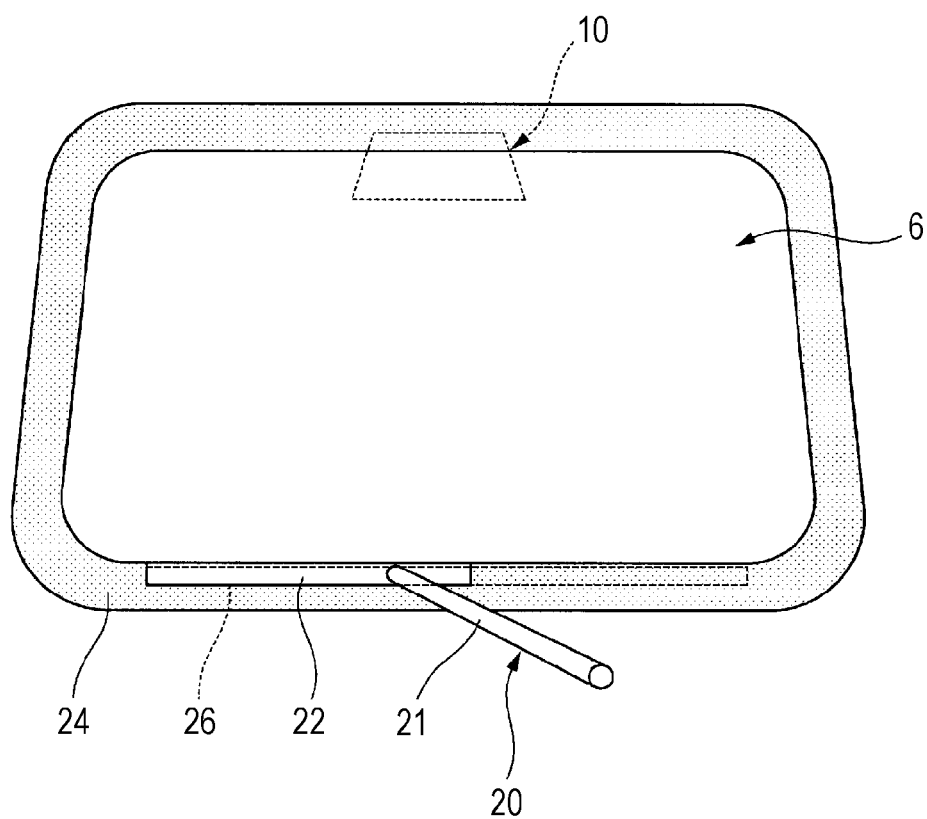
FIG. 2 is a schematic rear view of the vehicle including the rear viewing device according to the first embodiment.
Figure 3:
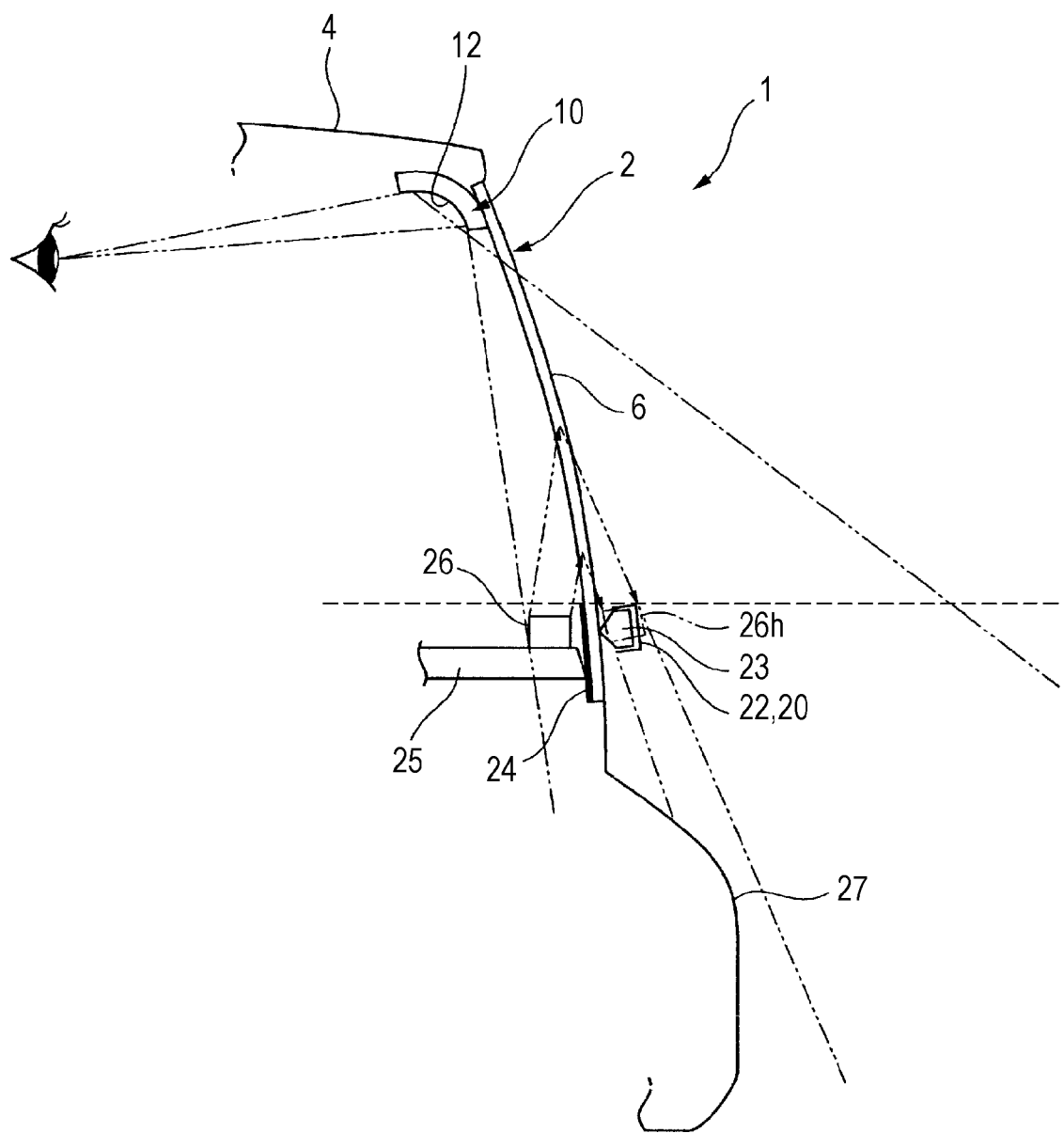
FIG. 3 is a schematic vertical sectional view of the rear part of the vehicle including the rear viewing device according to the first embodiment.
Figure 4:
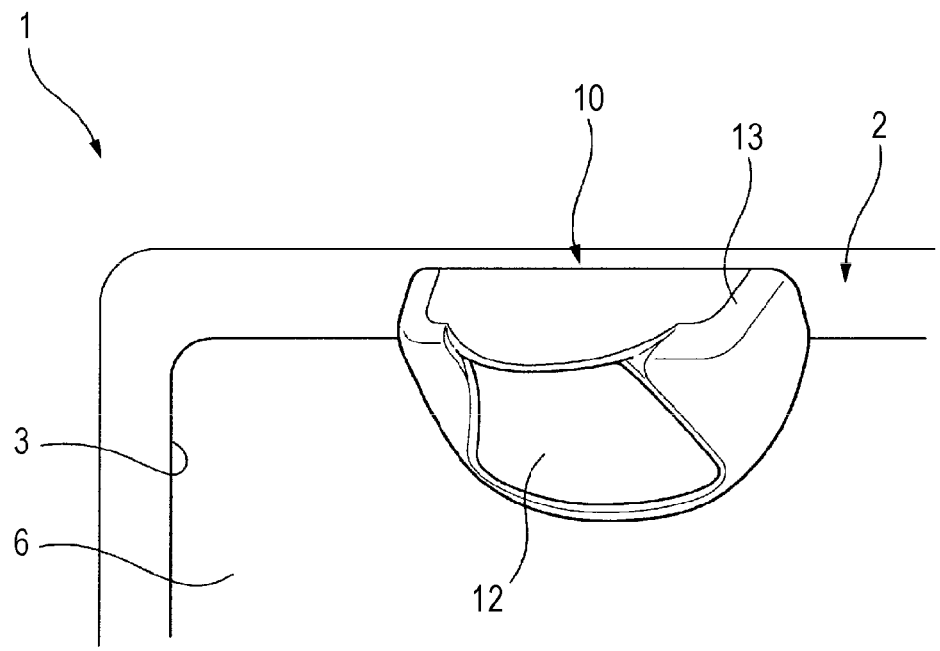
FIG. 4 is a perspective view of rear part of the interior of the vehicle including the rear viewing device according to the first embodiment.

FIG. 2 is a rear view of the vehicle 1, FIG. 2 mainly illustrating the rear windshield 6 in the back door 2 and the rear wiper 20. FIG. 3 is a vertical sectional view of the rear part of the vehicle 1. FIG. 4 is a perspective view of the back door 2 as viewed in the vehicle interior.

Referring to FIG. 2, the rear wiper 20 includes a wiper arm 21 rotated by a motor (not illustrated) and a wiper blade 22 attached to one end of the wiper arm 21. Referring to FIG. 3, the wiper blade 22 includes a blade rubber 23 in tight contact with the rear surface of the rear windshield 6. To conceal the periphery of the front surface of the rear windshield 6 (in the vehicle interior), the periphery of the front surface of the rear windshield 6 is coated with a black ceramic 24. When the rear wiper 20 is in its initial position to which the rear wiper 20 is returned upon stopping the operation of the rear wiper 20, the wiper blade 22 is substantially horizontally held at substantially the same level as the upper edge of the black ceramic 24 on the lower side such that the wiper blade 22 is aligned with the black ceramic 24 along the length of the vehicle body.

The rear under view mirror 10 is attached to the upper end of the back door 2 in the vehicle interior. In this embodiment, the rear under view mirror 10 includes a high-mount stop lamp unit (not illustrated) such that the lamp unit is incorporated in the rear part of the mirror. The rear under view mirror 10 is placed in the middle of the back door 2 along the width of the vehicle (i.e., in the middle of the vehicle 1 along the width thereof).

Referring to FIG. 4, the rear under view mirror 10 includes a reflecting mirror 12 reflecting an area below and behind the vehicle body through the rear windshield 6, a plastic housing 13 holding the reflecting mirror 12, and a base plate (not illustrated) which is directly secured to the upper end of the back door 2 and to which the housing 13 is finally fastened with, for example, screws. The high-mount stop lamp unit is attached to the base plate such that the light-emitting surface faces the surface on the vehicle interior side of the rear windshield 6.

The reflecting mirror 12 includes a concave and convex mirror which is concave in substantially the longitudinal direction and is convex in substantially the lateral direction. In this embodiment, the surface of the reflecting mirror 12 is obtained by shaping a three-dimensionally curved concave and convex surface into a substantially trapezoid such that the lower side is longer than the upper side. The reflecting mirror 12 is attached to the back door 2 through the base plate and the housing 13 such that the lower end of the mirror surface is inclined toward lower rear part of the vehicle body when the back door 2 is closed. With this placement, the reflecting mirror 12 can reflect a wide area below and behind the vehicle body as an erect mirror image to an occupant (driver) sitting on a driver seat. Specifically, in the concave and convex mirror surface of the reflecting mirror 12, convex part in substantially the lateral direction reflects an area below and behind the vehicle body along the width of the vehicle in a wide-angle manner and concave part in substantially the longitudinal direction provides the image reflected on the mirror surface as an erect mirror image whereby the driver can easily grasp a situation.

Referring to FIG. 3, in rear part of the vehicle interior, a lining 25 whose upper surface is flat is placed such that when the back door 2 is closed, the lining 25 is slightly higher than the lower edge of the rear windshield 6. The lining 25 extends along the rear windshield 6 in the width direction of the vehicle. When the back door 2 is closed, the lining 25 is in substantially tight contact with the front surface of the rear windshield 6.

On the upper surface of the rear end of the lining 25, a marker indicator 26 is placed. At least of the top surface of the marker indicator 26 is coated or colored with a bright color (including a luminescent color). In this embodiment, the marker indicator 26 constitutes the vehicle rear viewing device with the above-described rear under view mirror 10 and the rear wiper 20.

The marker indicator 26 includes a strip member which has a uniform thickness along the length of the vehicle and extends in the vehicle width direction. The marker indicator 26 is placed such that the upper end of the marker indicator 26 is lower than the upper end of the black ceramic 24 on the lower side of the rear windshield 6 when the back door 2 is closed. In addition, the marker indicator 26 is disposed such that the marker indicator 26 overlaps, or is partly covered with the wiper blade 22 along the length of the vehicle in front of the wiper blade 22 of the rear wiper 20 in the initial position, and the top surface of the marker indicator 26 is lower than the upper end of the wiper blade 22. The marker indicator 26 may be placed such that the marker indicator 26 is entirely covered with the back door 2 along the length of the vehicle.

The reflecting mirror 12 included in the rear under view mirror 10 reflects an area below and behind the vehicle to the occupant on the driver seat through the rear windshield 6 as described above. The angle of the reflecting mirror 12 is adjusted so as to simultaneously reflect an area at and near the lower rear end of the vehicle body, e.g., a rear bumper 27, when reflecting the area below and behind the vehicle in the above-described manner. However, since the rear wiper 20 and another projection are arranged on the rear surface of the rear windshield 6, it may be difficult to accurately determine the position of the lower rear end of the vehicle body on the basis of an image reflected on the reflecting mirror 12.

Accordingly, the rear viewing device is designed so that, when the occupant on the driver seat looks in the reflecting mirror 12 of the rear under view mirror 10, a reflected image 26h of the marker indicator 26 reflected by the rear windshield 6 is reflected on the reflecting mirror 12 so as to overlap an image of an object below and behind the vehicle 1 and the position of the reflected image 26h of the reflected marker indicator 26 coincides with the position of the rear end of the vehicle reflected on the reflecting mirror 12 through the rear windshield 6.

Figure 5:
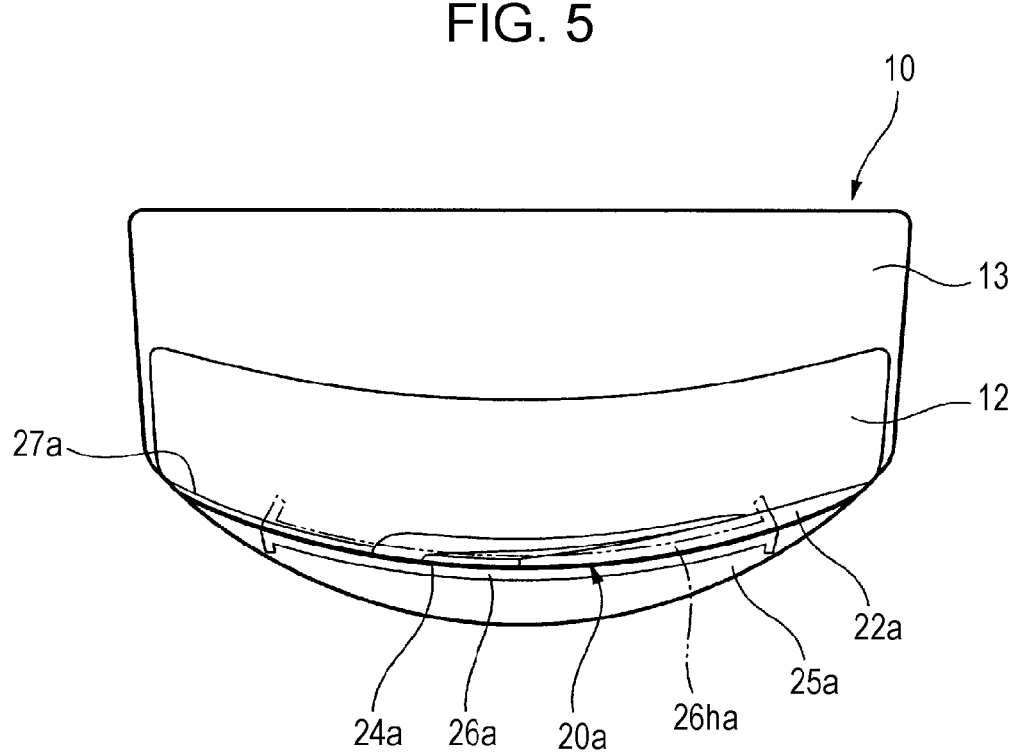
FIG. 5 is a front view of a rear under view mirror in the first embodiment.

FIG. 5 illustrates the rear under view mirror 10 and images reflected on the reflecting mirror 12 of the rear under view mirror 10. Referring to FIG. 5, on the reflecting mirror 12, the reflected image 26h of the marker indicator 26 is reflected as an image 26ha, the rear wiper 20 is reflected as an image 20a, and the wiper blade 22 is reflected as an image 22a. In addition, the rear bumper 27, i.e., the lower rear end of the vehicle is reflected as an image 27a on the reflecting mirror 12 and the lining 25, the marker indicator 26 (the real image), and the black ceramic 24 are reflected as images 25a, 26a, and 24a on the reflecting mirror 12. As illustrated in FIG. 5, (the image 26ha of) the reflected image 26h of the marker indicator 26 is reflected on the reflecting mirror 12 such that the upper edge of the image 26ha substantially overlaps the rear end of the rear bumper 27. Although it is difficult to directly recognize the lower rear end of the vehicle body because it is hidden by the rear wiper 20 and the like, the upper edge of (the image 26ha of) the reflected image 26h of the marker indicator 26 reflected on the reflecting mirror 12 is visibly recognized. Thus, the position of the lower rear end of the vehicle body can be grasped.

As described above, in the vehicle rear viewing device according to this embodiment, the marker indicator 26 placed on the lining 25 in the vehicle interior is disposed such that at least part of the marker indicator 26 is covered with the wiper blade 22 along the length of the vehicle in front of the wiper blade 22 in the initial position. Accordingly, when the rear windshield 6 is viewed from the rear of the vehicle body, the marker indicator 26 is hardly seen from the outside while being concealed by the wiper blade 22. Therefore, the use of this rear viewing device allows the occupant to accurately grasp the position of the lower rear end of the vehicle body when moving the vehicle backward without causing the appearance of the vehicle to be degraded due to the external visibility of the marker indicator 26.

In this embodiment, since the marker indicator 26 is disposed lower than the upper end of the black ceramic 24 applied to the lower edge of the rear windshield 6, the marker indicator 26 is doubly concealed by the black ceramic 24 and the wiper blade 22. In this embodiment, therefore, the marker indicator 26 is more difficult to see from the rear of the rear windshield 6. It is advantageous to increase the appearance of the vehicle.

In this embodiment, the marker indicator 26 is disposed so as to be partly covered with the wiper blade 22 in the initial position along the length of the vehicle. The marker indicator 26 may be placed so as to be entirely covered with the wiper blade 22 in the initial position along the length of the vehicle. Thus, the marker indicator 26 can be more effectively concealed.

Furthermore, the marker indicator 26 may be placed so as to be covered with the blade rubber 23 of the wiper blade 22 in the initial position along the length of the vehicle. Thus, the marker indicator 26 can be more difficult to see from the rear of the vehicle because the blade rubber 23 is in tight contact with the rear surface of the rear windshield 6.

In the rear viewing device according to this embodiment, the marker indicator 26 is placed on the lining 25 in front of the rear windshield 6 so that the reflected image 26h of the marker indicator 26 is reflected in the position of the lower rear end of the vehicle reflected on the reflecting mirror 12 of the rear under-view mirror 10. Accordingly, the marker indicator 26 can allow the occupant to accurately grasp the position of the lower rear end of the vehicle body on the basis of the reflected image 26h of the marker indicator 26 reflected on the reflecting mirror 12 without causing a blind spot in the occupant's view through the rear windshield 6.

In the rear viewing device, since the marker indicator 26 is disposed in the vehicle interior in front of the rear windshield 6, the marker indicator 26 is more difficult to see from the rear of the rear windshield 6. It is advantageous to increase the quality of the appearance.

Furthermore, in the rear viewing device, since the reflected image 26h of the marker indicator 26 is reflected on the rear under view mirror 10, the placement of the marker indicator 26 is not limited due to, for example, the shape of the lower rear end of the vehicle body. Accordingly, the flexibility of placement of the marker indicator 26 is high. The rear viewing device can easily support various vehicle body specifications.

In this embodiment, since the surface of the marker indicator 26 is colored with a bright color, the image of the marker indicator 26 reflected on the rear windshield 6 is bright and prominent. Advantageously, the occupant can easily recognize the lower rear end of the vehicle body.

A second embodiment of the present invention will be described below with reference to FIGS. 6 to 8.

Figure 6:
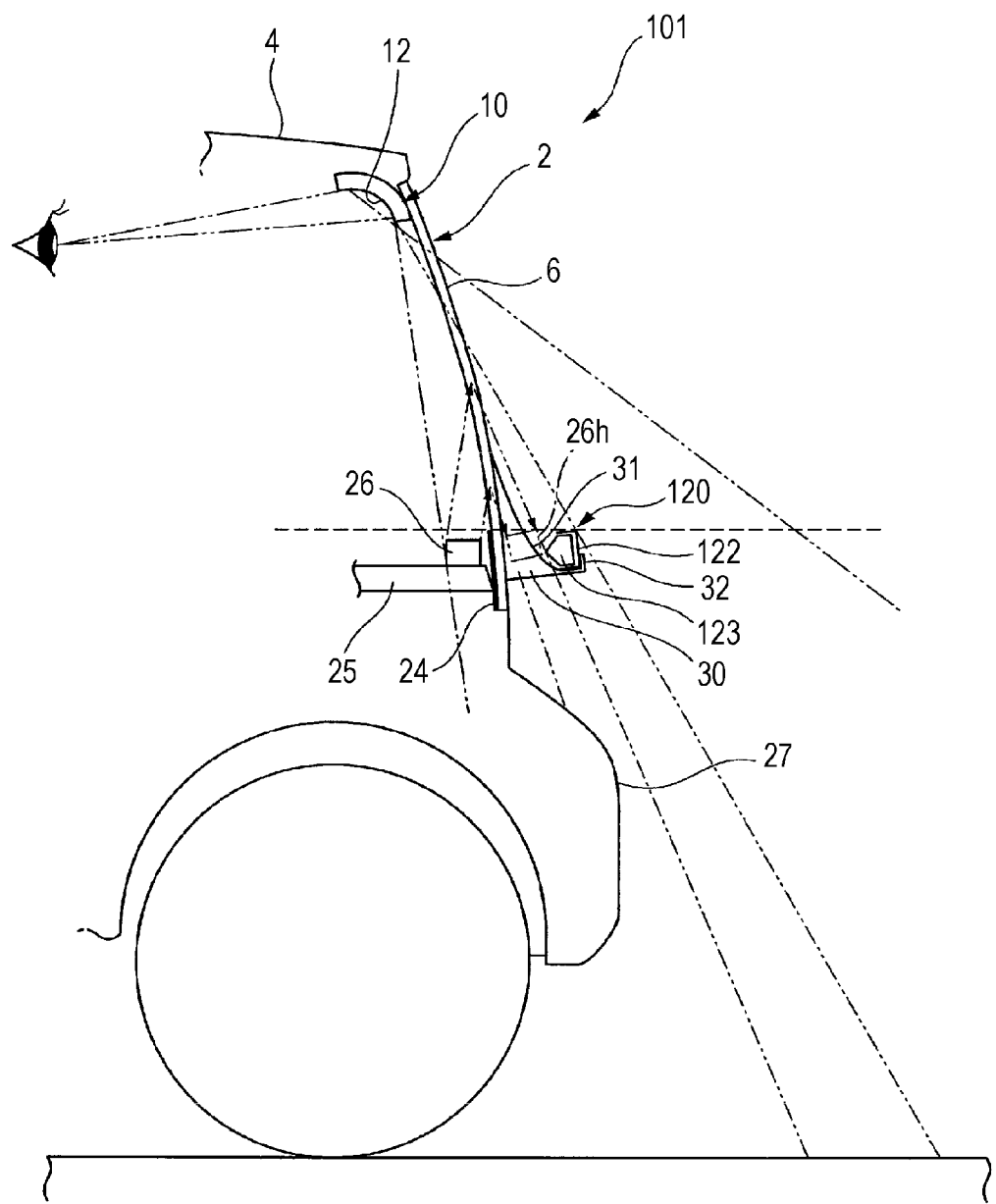
FIG. 6 is a schematic vertical sectional view of rear part of a vehicle including a rear viewing device according to a second embodiment of the present invention.

FIG. 6 is a vertical sectional view of a minivan type vehicle 101 similar to that in the first embodiment, FIG. 6 being similar to FIG. 3. The basic configuration of a vehicle rear viewing device according to this embodiment is the same as that according to the first embodiment in the following respects: the configuration of the rear under view mirror 10; and the placement of the marker indicator 26 in front of the rear windshield 6. In addition, the marker indicator 26 is disposed so as to be covered with a wiper blade 122 along the length of the vehicle in front of the wiper blade 122 of a rear wiper 120 in its initial position similar to the first embodiment. Similarly, the reflected image 26h of the marker indicator 26 on the rear windshield 6 is reflected on the reflecting mirror 12 of the rear under-view mirror 10. Furthermore, the rear viewing device is adjusted so that the position of the reflected image 26h of the marker indicator 26 reflected on the reflecting mirror 12 coincides with the position of the lower rear end of the vehicle body reflected on the reflecting mirror 12. The rear viewing device according to this embodiment differs from that according to the first embodiment in the configuration of the rear wiper 120.

Specifically, the rear wiper 120 includes a wiper arm (not illustrated) rotated by a motor, the wiper blade 122 attached to one end of the wiper arm, and a guide block (spacer) 30 which, when the wiper blade 122 is returned to the initial position at the lowest level upon stopping the operation of the rear wiper 120, comes into sliding contact with the wiper blade 122 to space the wiper blade 122 apart from the rear surface of the rear windshield 6 by a predetermined distance. The guide block 30 may come into sliding contact with the wiper arm to space the wiper blade 122 apart from the rear windshield 6. Referring to FIG. 6, the wiper blade 122 includes a blade rubber 123.

Figure 7:
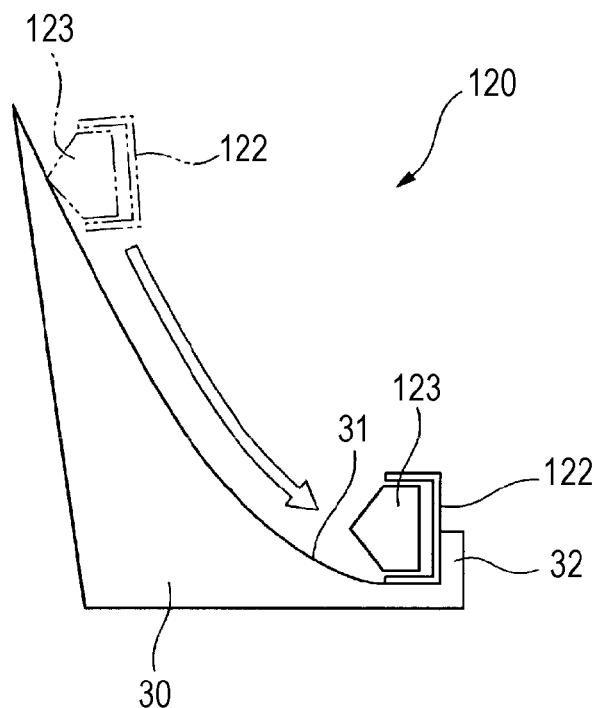
FIG. 7 is an enlarged side view of a part of the rear viewing device according to the second embodiment.

FIG. 7 is an enlarged side view of the guide block 30 and the wiper blade 122 in the rear wiper 120. FIG. 8 illustrates the rear under view mirror 10 and images reflected on the reflecting mirror 12 of the rear under view mirror 10. Referring to FIG. 8, the rear wiper 120 is reflected as an image 120a on the reflecting mirror 12, the wiper blade 122 is reflected as an image 122a thereon, and the guide block 30 is reflected as an image 30a thereon.

Figure 8:
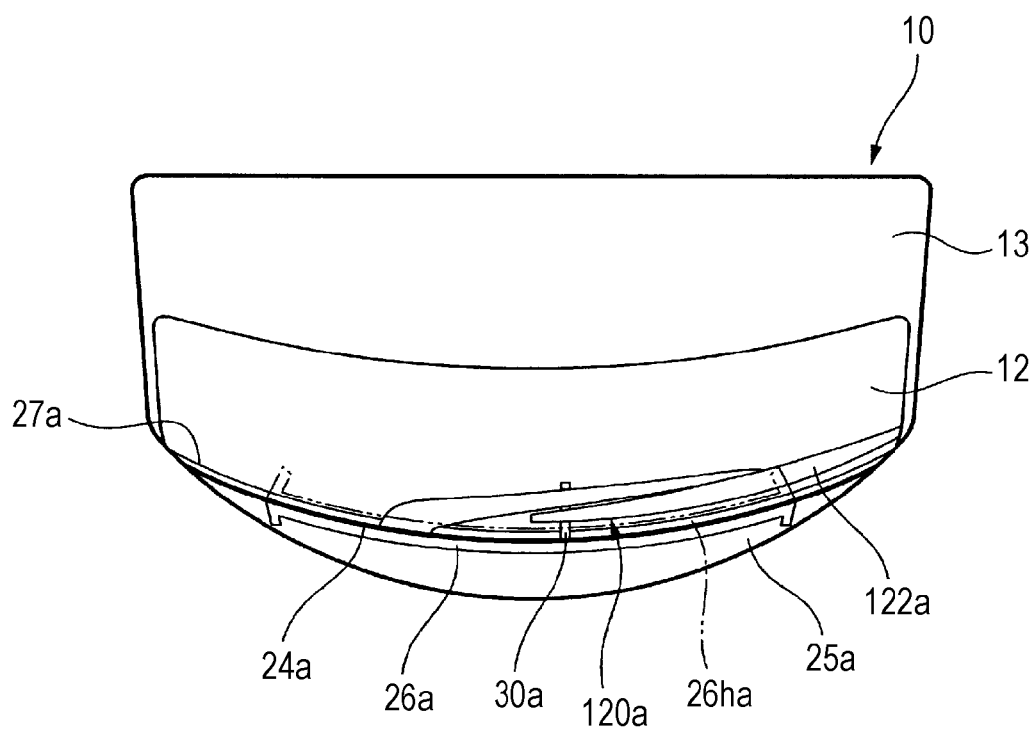
FIG. 8 is a front view of a rear under view mirror in the second embodiment.

The guide block 30 is made of a plate member whose width along the width of the vehicle is narrow as illustrated in FIG. 8. The guide block 30 is attached to the back door 2 so as to extend from the lower end of the rear windshield 6 to the rear of the vehicle body. The guide block 30 has a guide inclined surface 31 which serves as an upper surface and is downwardly inclined from the rear windshield 6 side to the rear of the vehicle body and includes a displacement stopper 32 substantially vertically extending from the lower end of the guide inclined surface 31, as illustrated in FIG. 7.

The guide inclined surface 31 of the guide block 30 is curved inward such that the radius of curvature gradually decreases toward a lower level. The guide inclined surface 31 may partly include a concave curve whose radius of curvature gradually decreases toward a lower level.

In the rear wiper 120, when the wiper blade 122 is returned to the initial position at the lowest level by the power of the motor upon stopping the operation of the rear wiper 120, part of the wiper blade 122 is moved onto the guide inclined surface 31 of the guide block 30. The wiper blade 122 is slid on the guide inclined surface 31 in accordance with the downward movement of the wiper blade 122. Consequently, the wiper blade 122 is displaced to the rear of the vehicle body while being guided by the guide inclined surface 31. When the wiper blade 122 is displaced to a predetermined position, the wiper blade 122 abuts against the displacement stopper 32, so that the displacement is stopped.

When the wiper blade 122 is displaced to the lowest position as described above, a space allowing the position of the lower rear end of the vehicle body to be easily seen is ensured between the rear windshield 6 and the wiper blade 122.

In this embodiment, similar to the first embodiment, the rear viewing device is adjusted so that the position of the reflected image 26h of the marker indicator 26 reflected on the reflecting mirror 12 of the rear under view mirror 10 coincides with the position of the lower rear end of the vehicle body reflected on the reflecting mirror 12 through the rear windshield 6.

In the first embodiment, since the wiper blade 22 of the rear wiper 20 is placed above the lower rear end of the vehicle body, the position of the rear end of the vehicle body is difficult to view. According to the present embodiment, the rear viewing device provides a space which allows an area below the vehicle body to be viewed between the rear windshield 6 and the wiper blade 122 when the wiper blade 122 is returned to the initial position as described above. Accordingly, the position of the rear end of the vehicle body can be viewed in the space through the reflecting mirror 12. Furthermore, the reflected image 26h of the marker indicator 26 can be reflected so as to coincide with the rear end of the vehicle body reflected on the reflecting mirror 12.

The rear viewing device according to this embodiment therefore allows the occupant to accurately grasp how close the lower rear end of the vehicle body is to an object upon, for example, moving the vehicle backward.

In this embodiment, the spacer spacing the wiper blade 122 apart from the rear windshield 6 includes the guide block 30 having the guide inclined surface 31 which comes into sliding contact with the wiper blade 122 when the wiper blade 122 is returned. Accordingly, such a very simple structure easy to manufacture can reliably space the wiper blade 122 apart from the rear windshield 6 when the wiper blade 122 is returned to the initial position.

In addition, in the rear viewing device according to this embodiment, since the guide inclined surface 31 of the guide block 30 of the rear wiper 120 includes the curve whose radius of curvature gradually decreases toward a lower level, the amount of movement of the wiper blade 122 to the rear of the vehicle can be gradually increased when the wiper blade 122 is downwardly moved to the initial position. In this device, therefore, since the amount of movement of the wiper blade 122 to the rear of the vehicle is not sharply increased, a stress acting on the components of the rear wiper 120 is reduced, so that the return action of the wiper blade 122 can be smoothed.

Furthermore, in the rear viewing device according to this embodiment, since the guide block 30 includes the displacement stopper 32 that restricts the lowest displacement of the wiper blade 122, the wiper blade 122 can be surely returned to the predetermined initial position at any time, thus stably providing a predetermined space between the wiper blade 122 and the rear windshield 6.

The present invention is not limited to the above-described embodiments and various changes of design are possible without departing from the scope and spirit of the invention.

According to the embodiment of the present invention, at least part of the rear of the marker indicator is concealed by the rear wiper in the initial position.

Since at least part of the marker indicator is concealed by the rear wiper when viewed from the rear of the vehicle body, the appearance of the vehicle is not degraded. When moving the vehicle backward, the occupant is allowed to surely recognize the position of the rear end of the vehicle body on the basis of the marker indicator reflected on the rear under view mirror.

The rear under view mirror may reflect an image of the area below and behind the vehicle through the rear windshield and an image (e.g., a reflected image 26h in the embodiment) of the marker indicator reflected by the rear windshield such that the image of the area overlaps the image of the marker indicator. The marker indicator may be disposed so that the position of the image of the marker indicator, reflected by the rear windshield, on the rear under view mirror coincides with that of the rear end of the vehicle body reflected on the rear under view mirror through the rear windshield.

Accordingly, when the occupant looks in the rear under view mirror, the marker indicator is reflected as an reflected image in the position of the rear end of the vehicle body reflected on the rear under view mirror. The occupant can recognize the position of the rear end of the vehicle body on the basis of the reflected image of the marker indicator.

Advantageously, the marker indicator allows the occupant to accurately recognize the position of the rear end of the vehicle body without causing a blind spot in the occupant's view through the rear windshield. Furthermore, since the marker indicator is disposed in the interior of the vehicle in front of the rear windshield, the marker indicator is more difficult to view from the rear of the vehicle body. It is therefore advantageous to increase the quality of the appearance. In addition, since the marker indicator is reflected as a reflected image on the rear under view mirror, the placement of the marker indicator is not restricted depending on the shape of the rear end of the vehicle body. Advantageously, the flexibility of placement of the marker indicator is high.

The marker indicator may be disposed so as to be entirely covered with the rear wiper in the initial position along the length of the vehicle.

Advantageously, the marker indicator can be more surely concealed from the rear of the vehicle body.

The rear wiper may include a blade rubber (e.g., a blade rubber 23 in the embodiment) and the marker indicator may be disposed so as to be covered with the blade rubber of the rear wiper in the initial position.

Advantageously, the marker indicator can be effectively concealed by the blade rubber which is the nearest to the rear surface of the rear windshield.

A surface, visually recognized through at least the rear under view mirror, of the marker indicator may be brightly colored.

Advantageously, the occupant can be allowed to more clearly recognize the position of the rear end of the vehicle body.

The rear wiper may include a wiper blade (e.g., a wiper blade 22 in the embodiment) and a spacer (e.g., a guide block 30 in the embodiment) that spaces the wiper blade apart from the rear surface of the rear windshield by a predetermined distance when the wiper blade is returned to the initial position upon stopping the operation of the wiper blade.

Accordingly, upon stopping the operation of the wiper blade, the wiper blade is spaced apart from the rear surface of the rear windshield, thus providing a space, allowing the lower rear end of the vehicle body to be easily viewed, between the rear windshield and the wiper blade.

Advantageously, the occupant can be allowed to more accurately recognize how close the rear end of the vehicle body is to an object when moving the vehicle backward.

The rear wiper may include a wiper arm and the spacer may have a guide inclined surface (e.g., a guide inclined surface 31 in the embodiment) that, when the wiper blade is downwardly moved to the initial position, comes into sliding contact with the wiper blade or the wiper arm to guide the wiper blade such that the wiper blade is spaced apart from the rear surface of the rear windshield.

Accordingly, when the wiper blade is downwardly moved to the initial position upon stopping the operation of the wiper blade, the wiper blade is guided along the guide inclined surface and is spaced apart from the rear windshield.

Advantageously, with such a very simple structure, the wiper blade can be surely spaced apart from the rear windshield when the wiper blade is returned to the initial position.

The guide inclined surface may have a concave curve whose radius of curvature gradually decreases toward a lower level.

Accordingly, as the wiper blade is downwardly moved to the initial position upon stopping the operation of the wiper blade, the distance between the wiper blade and the rear windshield gradually increases.

Advantageously, a load acting on the components of the rear wiper can be reduced.

The spacer may include a displacement stopper (e.g., a displacement stopper 32 in the embodiment) that restricts the lowest displacement of the wiper blade.

Advantageously, the wiper blade can be returned to the predetermined initial position at any time, so that a space for visual recognition can be stably ensured between the rear windshield and the wiper blade.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle rear viewing device comprising:
a rear under view mirror provided to face an inner surface of a rear windshield and capable of reflecting an area below and behind a vehicle to an occupant in an interior of the vehicle;
a marker indicator to allow the occupant to view the area below and behind the vehicle through the rear under view mirror to visually recognize a first position of a rear end of a vehicle body; and
a rear wiper provided on a rear part of the vehicle body so as to face an outer surface of the rear windshield,
wherein the marker indicator is provided so as to be covered with at least a part of the rear wiper along a front rear direction of the vehicle in front of the rear wiper when the rear wiper is in an initial position.

2. The device according to claim 1,
wherein the rear under view mirror is capable of reflecting an first image of the area below and behind the vehicle through the rear windshield and a second image of the marker indicator reflected by the rear windshield such that the first image overlaps the second image, and
wherein the marker indicator is disposed so that a second position of the second image of the marker indicator on the rear under view mirror coincides with the first position of the rear end of the vehicle body reflected on the rear under view mirror through the rear windshield.

3. The device according to claim 2,
wherein the marker indicator is disposed so as to be covered with the rear wiper in the initial position along the front rear direction of the vehicle.

4. The device according to claim 3,
wherein the rear wiper includes a blade rubber, and
wherein the marker indicator is disposed so as to be covered with the blade rubber of the rear wiper in the initial position along the front rear direction of the vehicle.

5. The device according to claim 4,
wherein a surface of the marker indicator is brightly colored and is visually recognized through at least the rear under view mirror.

6. The device according to claim 3,
wherein a surface of the marker indicator is brightly colored and is visually recognized through at least the rear under view mirror.

7. The device according to claim 2,
wherein the rear wiper includes a blade rubber, and
wherein the marker indicator is disposed so as to be covered with the blade rubber of the rear wiper in the initial position along the front rear direction of the vehicle.

8. The device according to claim 7,
wherein a surface of the marker indicator is brightly colored and is visually recognized through at least the rear under view mirror.

9. The device according to claim 2,
wherein a surface of the marker indicator is brightly colored and is visually recognized through at least the rear under view mirror.

10. The device according to claim 1,
wherein the marker indicator is disposed so as to be covered with the rear wiper in the initial position along the front rear direction of the vehicle.

11. The device according to claim 10,
wherein the rear wiper includes a blade rubber, and
wherein the marker indicator is disposed so as to be covered with the blade rubber of the rear wiper in the initial position along the front rear direction of the vehicle.

12. The device according to claim 11,
wherein a surface of the marker indicator is brightly colored and is visually recognized through at least the rear under view mirror.

13. The device according to claim 10,
wherein a surface of the marker indicator is brightly colored and is visually recognized through at least the rear under view mirror.

14. The device according to claim 1,
wherein the rear wiper includes a blade rubber, and
wherein the marker indicator is disposed so as to be covered with the blade rubber of the rear wiper in the initial position along the front rear direction of the vehicle.

15. The device according to claim 14,
wherein a surface of the marker indicator is brightly colored and is visually recognized through at least the rear under view mirror.

16. The device according to claim 1,
wherein a surface of the marker indicator is brightly colored and is visually recognized through at least the rear under view mirror.

17. The device according to claim 1,
wherein the rear wiper comprises
a wiper blade, and
a spacer to space the wiper blade apart from a rear surface of the rear windshield by a predetermined distance when the wiper blade is returned to the initial position upon stopping an operation of the wiper blade.

18. The device according to claim 17,
wherein the rear wiper includes a wiper arm, and
wherein the spacer has a guide inclined surface that, when the wiper blade is downwardly moved to the initial position, comes into sliding contact with the wiper blade or the wiper arm to guide the wiper blade such that the wiper blade is spaced apart from the rear surface of the rear windshield.

19. The device according to claim 18,
wherein the guide inclined surface has a concave curve whose radius of curvature gradually decreases toward a lower level.

20. The device according to claim 18,
wherein the spacer includes a displacement stopper to restrict lowest displacement of the wiper blade.

* * * * *